(12) United States Patent
Brandt et al.

(10) Patent No.: US 6,801,530 B1
(45) Date of Patent: Oct. 5, 2004

(54) COMMUNICATION SYSTEM AND METHOD IN A COMMUNICATION SYSTEM

(75) Inventors: Harald Brandt, Hägersten (SE); Zsolt Haraszti, Cary, NC (US); Rui Castro, Porto (PT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 829 days.

(21) Appl. No.: 09/664,915

(22) Filed: Sep. 18, 2000

(30) Foreign Application Priority Data

Sep. 20, 1999 (SE) .............................................. 9903390

(51) Int. Cl.[7] .............................................. H04L 12/28
(52) U.S. Cl. .................................. 370/392; 370/395.1
(58) Field of Search ................................ 370/229, 230, 370/230.1, 231, 232, 235, 235.1, 236, 395, 395.1, 389, 395.2, 395.4, 392

(56) References Cited

U.S. PATENT DOCUMENTS

| | | | |
|---|---|---|---|
| 6,594,268 B1 * | 7/2003 | Aukia et al. ................. | 370/400 |
| 6,633,540 B1 * | 10/2003 | Raisanen et al. ......... | 370/230.1 |
| 6,651,099 B1 * | 11/2003 | Dietz et al. .................. | 709/224 |

FOREIGN PATENT DOCUMENTS

| | | |
|---|---|---|
| EP | 0831669 A2 | 3/1998 |
| EP | 0831669 A3 | 3/1998 |
| WO | WO 98/28938 | 7/1998 |

OTHER PUBLICATIONS

Karavassilis, N., EPO Standard Search Report, File No. RS 103827 SE, Swedish App. No. 9903390, Mar. 10, 2000, pp. 1–3.

Eom, D.S., et al., "A Combination Scheme of ARQ and FEC for Multimedia Wireless ATM Networks," IEICE Transactions on Communications, JP, Institute of Electronics Information and Comm. Eng. Tokyo, vol. E81–B, No. 5, May 1, 1998, pp. 1016–1024.

Palacharla, S., et al., "Design and Implementation of a Real–Time Multimedia Presentation System Using RTP," Proceedings of the Annual International Computer Software and Applications Conference (COMPSAC), US, Los Alamitos, IEEE Comp. Soc. Press, vol. CONF. 21, 1997, pp. 376–381.

Ilvesmaki, M., et al., "Flow Classification Schemes in Traffic–Based Multilayer IP Switching—Comparison Between Conventional and Neural Approach," Computer Communications, GB, Butterworths & Co. Publishers Ltd., vol. 21, No. 13, Sep. 1, 1998, pp. 1184–1194.

* cited by examiner

*Primary Examiner*—Steven Nguyen
*Assistant Examiner*—Roberta Stevens

(57) ABSTRACT

An Internet Protocol network having service differentiation depending on whether or not a flow in the network is a real-time flow. An aggregated flow within the Internet Protocol network passes through a flow classifier before entering a node. The flow classifier distinguishes the aggregated flow into set of flows, each flow corresponding to a unidirectional packet stream from a single session. The flow classifier then executes at least one of a plurality of checks including: checking payload size; checking for static behavior in header fields that are predictably constant if the flow is a real-time flow; and checking for incremental behavior of header fields, which predictably increment if the flow is a real-time flow. Based on the checks, the flow classifier decides whether the flow is a real-time flow or a non-real-time flow.

32 Claims, 3 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |              SN               |
+-+-+-+-+-+-+-+-+-+-+-+-+-+-+-+-+-+-+-+-+-+-+-+-+-+-+-+-+-+-+-+-+
|                              TS                               |
+-+-+-+-+-+-+-+-+-+-+-+-+-+-+-+-+-+-+-+-+-+-+-+-+-+-+-+-+-+-+-+-+
|                             SSRC                              |
+=+=+=+=+=+=+=+=+=+=+=+=+=+=+=+=+=+=+=+=+=+=+=+=+=+=+=+=+=+=+=+=+
|                             CSRC                              |
|                             : : :                             |
+-+-+-+-+-+-+-+-+-+-+-+-+-+-+-+-+-+-+-+-+-+-+-+-+-+-+-+-+-+-+-+-+
```

Fig. 1

COMMUNICATION SYSTEM AND METHOD IN A COMMUNICATION SYSTEM

FIELD OF INVENTION

The present invention relates to the field of IP (Internet Protocol) networks and more specifically to an IP network, a Flow Classifier and a method for classifying IP flows in an IP network.

DESCRIPTION OF RELATED ART

Data networks for transferring electronic information are becoming increasingly widespread for the communication of many different types of data including text, graphics, voice and video data used with a computer. Such networks enable the interconnection of large numbers of computer workstations, telephone and television systems, video teleconferencing systems and other facilities over common data links or carriers.

Protocols between communicating computer systems are often implemented at multiple layers of a structural model. TCP/IP (Transport Control Protocol/Internet Protocol) and UDP/IP (User Datagram Protocol/Internet Protocol) are used to communicate across any set of interconnected networks. The TCP/IP and the UDP/IP software are both organised into four conceptual layers that are built on a fifth layer, the hardware. The highest layer is the application layer, followed by the transport layer, the network layer, the data link layer and the physical layer, which is the hardware layer. For example the physical layer uses various transport mediums, and the data link layer insures that the individual data packets are not corrupted during transmission between two directly connected systems. In TCP/IP the network and transport layers ensure that data packets arrive at the correct systems within a network and in a correct order. UDP/IP does not correct corrupted packets and does not ensure that the data packets arrive in a correct order. IP is a network protocol and TCP and UDP are transport protocols. Higher layers also talk to one another using various preselected protocols, for example RTP (Real time Transfer Protocol) which is a protocol for the transport of real-time data. Real-time data is a form of data where the correctness of the received packets depends not only on the logical result of the received data but also on the time at which the data arrives, such as audio and video. RTP is typically used over UDP. When transferring real-time data, using RTP and UDP protocols over an IP network the real-time data is broken up into frames. To keep track of details, such as frame sequence and timing, RTP attaches a header to each frame and hands over the resulting RTP frame (RTP header+frame) to UDP. UDP then adds its own header to the RTP frame=UDP datagram and hands it over to IP. IP then adds its own header to the UDP datagram=IP datagram. The resulting packet of data appears to be real-time data+RTP header+UDP header+IP header.

The specification documents of the Internet protocol suite, as defined by the IETF (Internet Engineering Task Force) and its steering group (the IESG), are published as RFCs (Requests for Comments).

In conventional IP networks, protocol layers operate in a rather isolated mode. For example, the transport layer offers the same service to all applications. Vice versa, applications operate independently of the characteristics, e.g. bandwidth and packet loss rate, of the underlying transport network.

A problem is that a too long time delay in situations of temporary overload in a node makes real-time data, such as audio or video, useless but does not cause corresponding damage to other types of data. This problem would be alleviated if real-time data were prioritised over non-real-time data. In this case and other cases where service differentiation is crucial, it is required that the server entity can distinguish between packets with different service demands. Often, one base of the differentiation is application category and/or different protocol format used by the flow. This assumes that the node in order to distinguish between packets with different service demands must know the type of application and/or protocol. For example the use of RTP protocol points out that the flow is a real-time flow and shall in case of temporary overload be prioritised over non-real-time flow.

Other examples of where service differentiation is required based on whether real-time data or other types of data is transferred are:

when an outgoing link of a node is a radio link, where the allocation of radio recourses depends on whether the transmitted data is real-time data or non-real-time data, requesting the link layer to recover from errors, which is not required for real-time data but for other types of data, and access to a server or to a network.

When protocol units are encapsulated in other lower-layer protocol units, a convenient way to identify the type of the encapsulated protocol is to use an explicit field in the header of the encapsulating lower-layer (e.g. IP) protocol. This is implemented in IP version 4 and IP version 6. This explicit field is the so-called TOS (Type Of Service) field and the network nodes that implement the differentiated services enhancements to IP use a codepoint in the IP header to select a PHB (Per-Hop Behaviour) as the specific forwarding treatment for that packet. This is described in the RFC 2598.

Thus, by reading this field, any unit that processes the packet flow can easily learn the type of the encapsulated protocol. Unfortunately, this explicit information is not commonly used.

The UDP header and TCP header do not carry any explicit information that can tell a receiving node that its payload contains real-time data.

U.S. Pat. No. 5,903,735 describes a method and apparatus of transmitting time critical messages over a network path having a plurality of nodes. The data is classified as minimal bandwidth data in the first node and prioritised over other data without minimal bandwidth requirements when transmitted. The higher priority is maintained by the plurality of nodes of the network path.

The problem is solved by bandwidth reservation through the path. This is, of course, a waste of bandwidth during those periods when less than the full bandwidth is required.

Therefore, what is further needed is a mechanism for classifying a flow as being a real-time flow or not, without explicit protocol format identifiers, without explicit flow description messages and without unnecessary waist of bandwidth.

SUMMARY OF THE INVENTION

The present invention relates to the requirement of differentiated service to real time packets and other type of packets, in an IP network. More particularly it relates to the problem with unacceptable latency in the network resulting in real-time packet being useless to the receiver.

A problem for a node is to know whether a received datagram comprises real-time data or not.

Accordingly, it is an object of the present invention to unravel the above-mentioned problems.

The aforesaid problems are solved by means of an IP network wherein a series of checkings in the headers of a flow classifies the flow as being a real-time flow or non-real-time flow.

The following scenario of classifying a flow describes the inventive concept of the present invention.

An aggregated flow within an IP network passes through a Flow Classifier before entering a node. The Flow Classifier distinguishes the aggregated flow into set of flows, each corresponding to an uni-directional packet stream from a single session. The Flow Classifier executes at least one of the following checkings on each flow:

checking payload size, checking for static behaviour in header fields that are predictably constant if the flow is a real-time flow or checking for incremental behaviour of header fields, which predictably increment if the flow is a real-time flow.

Based on these checkings, the Flow Classifier decides whether the flow is a real-time flow or non-real-time flow.

An advantage of the present invention is that the real-time flow will be faster transferred over the network.

Another advantage of the invention is that network recourses will be more efficiently used.

Yet an advantage of the present invention is that real-time data is identified independently of whether explicit description (e.g. by means of signalling) of the real-time flow is available or not.

Another advantage of the present invention is that, when it is used in radio access networks for detecting IP packet flows with real-time requirements, the resource allocation can then be optimised. This improves the network utilisation and the service quality perceived by the user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 shows an RTP header.

DESCRIPTION OF PREFFERED EMBODIMENTS

Figure 2:
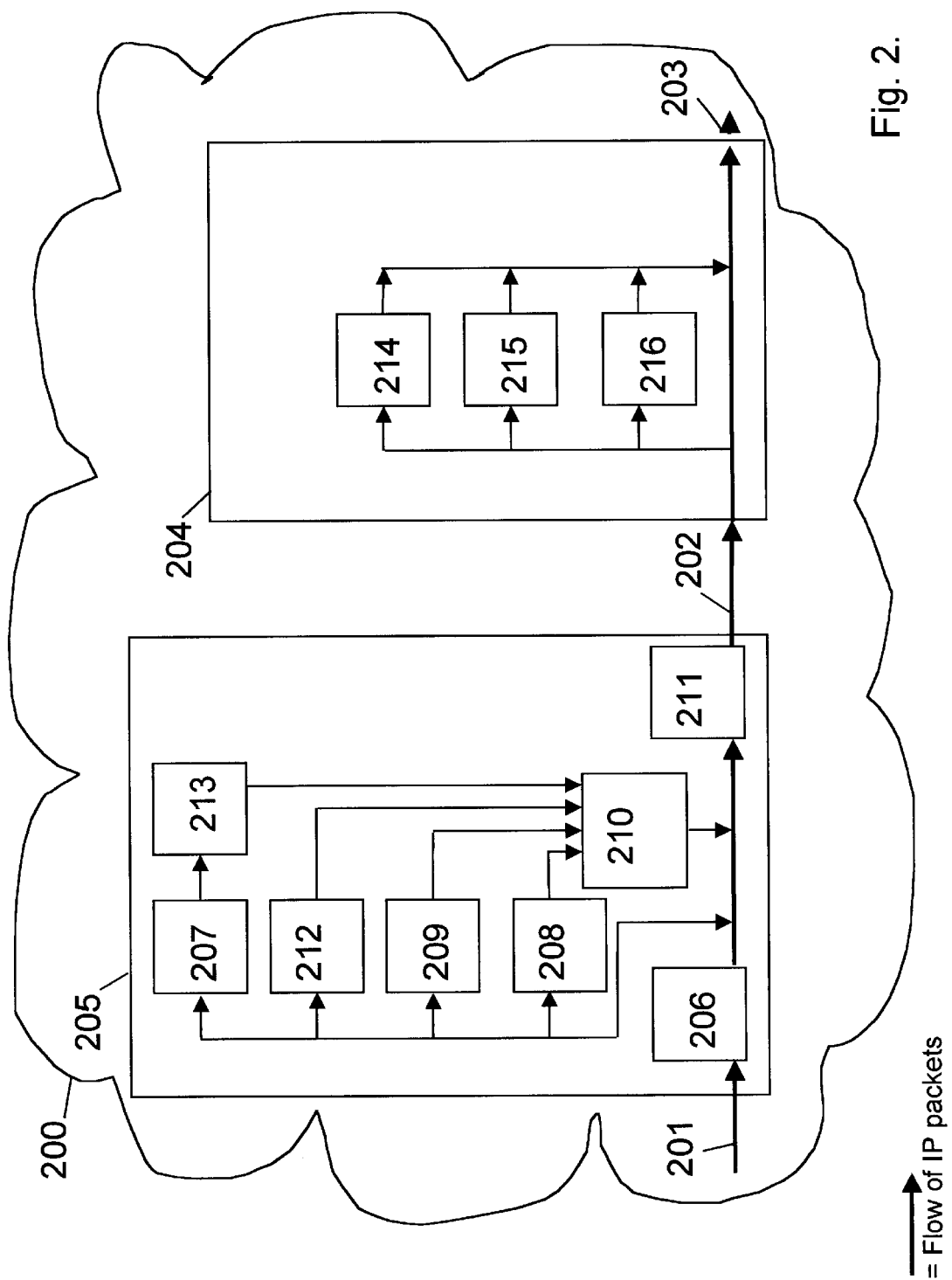
FIG. 2 shows an overview of an IP network according to the invention.

An RTP header will now be described according to RFC 1889 section 5, to simplify the understanding of the preferred embodiments. The RTP protocol unit header has some predictable properties that make it possible to test a UDP flow and tell if it contains RTP frames or not. However, the invention is not merely applicable to RTP flows only, it is applicable to other protocol formats that have similar predictable header behaviour. The format of the RTP header is shown in FIG. 1. The fields have the following meaning:

Version V: 2 Bits

This field identifies the version of RTP. The version defined by this specification is two (2).

Padding P: 1 Bit

If the padding bit is set, the packet contains one or more additional padding octets at the end which are not part of the payload. The last octet of the padding contains a count of how many padding octets should be ignored. Padding may be needed by some encryption algorithms with fixed block sizes or for carrying several RTP packets in a lower layer protocol data unit.

Extension X: 1 Bit

If the extension bit is set, the fixed header is followed by exactly one header extension, with a format defined in section 5.3.1 in the RFC mentioned above.

CSRC Count CC: 4 Bits

The CSRC (synchronisation source) count contains the number of CSRC identifiers that follow the fixed header.

Marker M: 1 Bit

The interpretation of the marker is defined by a profile. It is intended to allow significant events such as frame boundaries to be marked in the packet stream. A profile may define additional marker bits or specify that there is no marker bit by changing the number of bits in the payload type field. This is further described in section 5.3 in the RFC mentioned above.

Payload Type PT: 7 Bits

This field identifies the format of the RTP payload and determines its interpretation by the application. A profile specifies default static mapping of payload type codes to payload formats. Additional payload type codes may be defined dynamically through non-RTP means, which is further described in section 3 in the RFC mentioned above. An initial set of default mappings for audio and video is specified in the companion profile Internet-Draft draft-ietf-avt-profile, and may be extended in future editions of the Assigned Numbers RFC. An RTP sender emits a single RTP payload type at any given time; this field is not intended for multiplexing separate media streams.

Sequence Number SN: 16 Bits

The sequence number increments by one for each data packet sent, and may be used by the receiver to be detect packet loss and to restore packet sequence. The initial value of the sequence number is random (unpredictable) to make known-plaintext attacks on encryption more difficult, even if the source itself does not encrypt, because the packets may flow through a translator that does.

Timestamp TS: 32 Bits

The timestamp reflects the sampling instant of the first octet in the RTP data packet. The sampling instant must be derived from a clock that increments monotonically and linearly in time to allow synchronisation and jitter calculations (see further in section 6.3.1 in the RFC mentioned above) The resolution of the clock must be sufficient for the desired synchronisation accuracy and for measuring packet arrival jitter (one tick per video is typically not sufficient). The clock frequency is dependent on the format of data carried as payload and is specified statically in the profile or payload format specification that defines the format, or may be specified dynamically for payload formats defined through non-RTP means. If RTP packets are generated periodically, the nominal sampling instant as determined from the sampling clock is to be used, not a reading of the system dock. As an example, for fixed-rate audio the timestamp clock would likely increment by one for each sampling period. If an audio application reads blocks covering 160 sampling periods from the input device, the timestamp would be increased by 160 for each such block regardless of whether the block is transmitted in a packet or dropped as silence.

Synchronisation Source SSRC: 32 Bits

The SSRC field identifies the synchronisation source. This identifier is chosen randomly, with the intent that no two synchronisation sources within the same RTP session will have the same SSRC identifier. An example algorithm for generating a random identifier is presented in Appendix A.6 in the above mentioned RFC. Although the probability of multiple sources choosing the same identifier is low, all RTP implementations must be prepared to detect and resolve collisions. If a source changes its source transport address, it must also choose a new SSRC identifier to avoid being interpreted as a looped source.

Contributing Source CSRC List 0–15 Items, 32 Bits Each

The CSRC list identifies the contributing sources for the payload contained in this packet. The number of identifiers is given by the CC field. If there are more than 15 contributing sources, only 15 may be identified. CSRC identifiers are inserted by mixers, using the SSRC identifiers of contributing sources. For example, for audio packets the SSRC identifiers of all sources that were mixed together to create a packet area listed, allowing correct talker indication at the receiver.

In FIG. 2 the preferred embodiment of the IP network 200 in which services are differentiated based on whether a transmitted flow 201, 202, 203 is a real-time flow or not is illustrated. The IP network 200 comprises interconnected nodes 204 representing for example, switches, routers and hosts. An aggregated flow is defined as a mix of all the different flows being transferred over a point in the IP network 200, each flow corresponding to a uni-directional packet stream of IP datagram from a single session. Aggregated flows are transferred in the IP network 200 between the nodes 204. The IP network 200 also comprises Flow Classifiers 205 through which an aggregated flow 201, 202 passes before entering a node 204. A Flow Classifier 205 can also be co-located in a node 204.

The Flow Classifier 205 has means 206 for distinguishing the incoming aggregated flow 201 into a set of flows, each flow corresponding to an unidirectional packet stream of IP datagram from a single session. This distinguishing makes it possible for the Flow Classifier 205 to look at a flow from a single session at a time.

The Flow Classifier 205 also has means 207 for checking payload size of the transport layer datagram of a packet in a flow of a particular session and also means 213 for checking if the payload size of the transport layer datagram is larger than the smallest possible datagram of a specific session comprising real-time data. If it is, it might be a real-time flow, but if it is not, it is not a real-time flow. For example, checking if the UDP payload size is larger than the smallest possible RTP frame.

The Flow Classifier 205 also has means 208 for looking at a number of consecutive data packets in the flow of the specific session and checking for static behaviour in the header fields, which are predictably constant if the flow of the particular session is a real-time flow. For example, check if the header fields, that are supposed to be constant in consecutive RTP frames within a session, are constant in the investigated flow. Examples of constant RTP header fields are the version V field and the payload PT field. The payload type PT field tells what is inside RTP, such as if it is GSM codec, if it is voice or if it is something else. These are constant during the session if it is a real-time flow. If these header fields in the investigated flow are not constant, it is a non-real-time flow.

The Flow Classifier 205 also has means 209 for looking at a number of consecutive data packets in the flow of the specific session and checking incremental behaviour of header fields, which are predictably incremented if the flow of a particular session is a real-time flow. For example, checking in the possible RTP header if the fields that are supposed to be incremented, according to above mentioned RFC 1889, are incremented. Examples of incrementing RTP header fields are the sequence number SN field and the timestamp TS field. If these header fields, that are supposed to be incremented in the investigated flow, are not incremented, it is a non-real-time flow.

The Flow Classifier 205 further has means 212 for checking if the values of the header fields of an application datagram satisfy the range restrictions of the header of an application datagram comprising real-time data, e.g. an RTP frame. If the range restrictions are not satisfied in the investigated flow, it is not a real-time flow.

The Flow Classifier 205 further has means 210 for deciding whether the flow is a real-time flow or not, based on the previous checkings. When looking at a number of consecutive data packets in the flow, consideration has to be taken that some packet or packets might be missing.

The Flow Classifier 205 has means 211 for reporting the decision whether the flow is a real-time flow or not to the node 204.

In one embodiment of the present invention, an outgoing link 203 of the node 204 constitutes a radio link and the node 204 has means 214 for allocating radio resources on basis of the flow being a real-time flow or not.

In another embodiment, the node 204 has means 215 to request the link layer to either recover from errors if the flow is a non-real-time flow or not recover from errors if the flow is a real-time flow. There is no requirement for recovering from errors when transferring real-time data.

In yet another embodiment, the node 204 constitutes a switch. The switch has means 216 for prioritising a real-time flow over non-real-time flow when switching, e.g. in situations of temporary overload.

In yet another embodiment, the node 204 constitutes a router. The router has means 216 for prioritising a real-time flow over non-real-time flow when routing, e.g. in situations of temporary overload.

Figure 3:
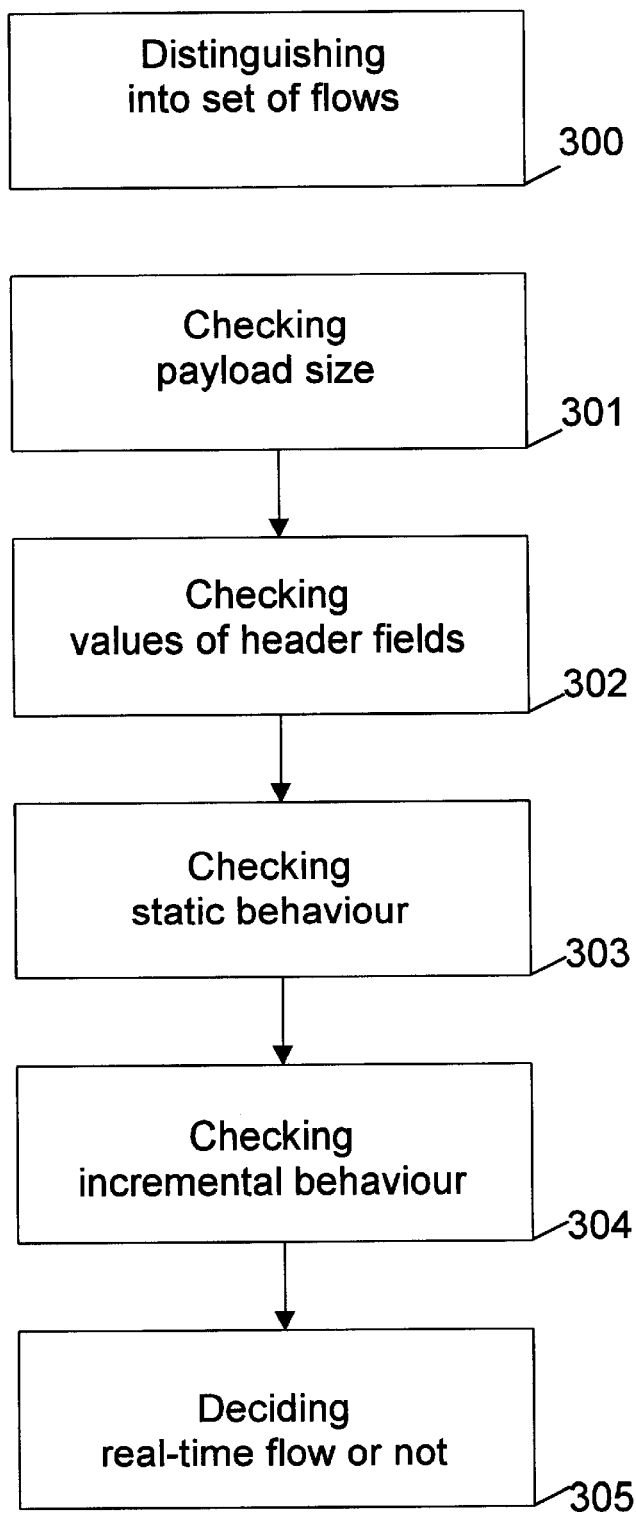
FIG. 3 shows a flowchart of the general method of the invention.

FIG. 3 shows a flowchart of a possible scenario of distinguishing a real-time flow from other types of flows in a stream of IP packets in an IP network 200.

The IP network 200 comprises interconnected nodes 204. Aggregated flows are transferred in the IP network 200 between the nodes 204. The node 204 has accordingly an incoming aggregated flow of IP datagram. The incoming aggregated flow is distinguished 300 into a set of flows, where each flow corresponds to an uni-directional packet stream from a single session. This makes it possible to look at a flow from a single session at a time.

The method then comprises at least one of following checkings:

Checking payload size 301 of the transport layer datagram of a packet in a flow of a particular session. In one embodiment it is also possible to check if the payload size of the transport layer datagram is larger than the smallest possible datagram of a specific session comprising real-time data, e.g. checking if the UDP payload size is larger than the smallest possible RTP frame. If it is, it might be a real-time flow. If it is not, it is not a real-time flow.

Checking if the values of the header fields of an application datagram satisfy the range restrictions 302 of the header of an application datagram comprising real-time data, e.g. an RTP frame. If the range restrictions are not satisfied in the investigated flow, it is not a real-time flow.

Looking at a number of consecutive data packets in the flow of the specific session and checking for static behaviour 303 in the header fields that are predictably constant if the flow of the particular session is a real-time flow. For example checking if the header fields that are supposed to be constant in consecutive RTP frames within a session are constant in the investigated flow. Examples of constant RTP header fields are the version V field and the payload PT field. The payload type PT field tells what is inside RTP such as if it is from a GSM codec, if it is voice or if it is something else. These are constant during the session if it is real-time. If these header fields in the investigated flow are not constant, it is not a real-time flow.

Looking at a number of consecutive data packets in the flow of the specific session and checking incremental behaviour 304 of header fields, which are predictably incremented if the flow of a particular session is a real-time flow.

For example checking in the possible RTP header if the fields that are supposed to be incremented, according to above mentioned RFC 1889, are incremented. Examples of incrementing RTP header fields are the sequence number SN field and the timestamp TS field. If these header fields that are supposed to be incremented in the investigated flow are not incremented, it is not a real-time flow.

The method comprises the further step of deciding 305 whether the flow is a real-time flow or not, based on the previous checkings.

The performed checkings are each resulting in either non-real-time flow or possible real-time flow. If one of the checking steps above shows that it is non-real-time data, then no more checkings are required. An example of how these checkings can be performed will now be described:

First, checking if the payload size of the UDP payload size is larger than the smallest possible RTP frame. If it is not, the flow is classified as a non-real-time flow. If it is, it might be a real-time flow and further checkings are required.

If so, follows a checking if the values of the header fields of an application datagram satisfy the range restrictions 302 of an RTP header. If the range restrictions are not satisfied in the investigated flow, the flow is classified as a non-real-time flow. If they are satisfied it might be a real-time flow and further checkings are required. In that case next step is to check if the header fields that are supposed to be constant in consecutive RTP frames within a session are constant in the investigated flow. If they are not constant, the flow is classified as a non-real-time flow. If they are constant, it is a possible real-time flow and further checking is required.

In that case, checking in the possible RTP header if the fields, that are supposed to be incremented in consecutive RTP frames according to above mentioned RFC 1889, are incremented. If these header fields are not incremented, the flow is classified as a non-real-time flow. On the other hand, if these header fields are incremented, the flow is classified as a real-time flow.

When looking at a number of consecutive data packets in the flow and checking for incremental behaviour, consideration has to be taken into that some packet or packets might be missing.

In one embodiment the method comprises a step of reporting the decision whether the flow is a real-time flow or not, to the node 204.

What is claimed is:

1. An Internet Protocol network having service differentiation based on whether or not a flow in the network is a real-time flow, the Internet Protocol network including a flow classifier capable of checking one or more of a plurality of features of said flow, each of said plurality of features being indicative of said flow being either not a real-time flow or possibly a real-time flow, said flow classifier including:
    a plurality of feature classifiers, each of said plurality of feature classifiers being capable of checking a different one of said plurality of features and of classifying said flow as either not a real-time flow or as possibly a real-time flow, wherein said plurality of feature classifiers includes a feature classifier capable of checking the feature of a payload size of a transport layer datagram of a packet of said packet stream; and
    a decider capable of deciding that said flow is a real-time flow if all of said plurality of feature classifiers classify said flow as possibly a real-time flow.

2. The Internet Protocol network according to claim 1, and further including a node receiving an incoming aggregated flow of Internet Protocol datagram via the flow classifier, and wherein said flow classifier further includes
    a distinguisher which distinguishes the aggregated flow into at least one set of flows, each said flow corresponding to a uni-directional packet stream from a particular session.

3. The Internet Protocol network according to claim 2, and further including a reporter capable of reporting to said node whether said flow is not a real-time flow or is a real-time flow as decided by said decider.

4. The Internet Protocol network according to claim 2, wherein said plurality of feature classifiers includes a feature classifier capable of checking the feature of static behavior in header fields of a number of consecutive data packets of said packet stream.

5. The Internet Protocol network according to claim 2, wherein said plurality of feature classifiers includes a feature classifier capable of checking the feature of incremental behavior of header fields of a number of consecutive packets of said packet stream.

6. The Internet Protocol network according to claim 2, wherein said plurality of feature classifiers includes a feature classifier capable of checking if values of header fields of an application datagram in a flow of a said session satisfy range restrictions for a header of an application datagram comprising real-time data.

7. The Internet Protocol network according to claim 1, wherein said plurality of feature classifiers includes a feature classifier capable of checking if the payload size of a transport layer datagram is at least as large as a smallest possible datagram of any session comprising real-time data.

8. The Internet Protocol network according to claim 3, wherein an outgoing link of the node is a radio link, and wherein the node includes an allocator which allocates at least one radio resource on basis of the flow being either a real-time flow or not a real-time flow.

9. The Internet Protocol network according to claim 3, wherein the node includes a requester which requests a link layer to recover from errors If the flow Is not a real-time flow.

10. The Internet Protocol network according to claim 3, wherein the node includes a requester which requests a link layer not to recover from errors if the flow is a real-time flow.

11. The Internet Protocol network according to claim 3, wherein the node is a switch which prioritizes a flow which is a real-time flow over a flow which Is not a real-time flow when switching.

12. The Internet Protocol network according to claim 3, wherein the node is a router which prioritizes a flow which is a real-time flow over a flow which is not a real-time flow when routing.

13. The Internet Protocol network according to claim 2, wherein the real-time flow carries Real-time Transfer Protocol frames and the flow is a User Datagram Protocol flow.

14. A flow classifier for classifying whether a transmitted flow, comprising datagrams, within an Internet Protocol network is a real-time flow or is not a real-time flow, said flow classifier receiving an aggregated flow of Internet Protocol packets, and comprising:

a distinguisher which distinguishes at least one set of flow in the aggregated flow, each flow corresponding to a uni-directional packet stream from a single session, a plurality of feature classifiers, each of said plurality of feature classifiers being capable of checking a different one of a plurality of features of said flow and classifying said flow as either not a real-time flow or as possibly a real-time flow, wherein said plurality of feature classifiers includes a feature classifier capable of checking a payload size of a transport layer datagram of a packet in said packet stream, and a decider capable of deciding that said flow is a real-time flow if all of said plurality of feature classifiers classify said flow as possibly a real-time flow.

15. A flow classifier according to claim 14, wherein said plurality of feature classifiers includes a feature classifier capable of checking for static behavior in header fields of a number of consecutive data packets in said packet stream.

16. A flow classifier according to claim 14, wherein said plurality of feature classifiers includes a feature classifier capable of checking for an incremental behavior of header fields of a number of consecutive data packets in said packet stream.

17. A flow classifier according to claim 14, wherein said plurality of feature classifiers includes a feature classifier capable of checking if values of possible header fields of an application datagram in a flow of said session satisfy range restrictions for a header of an application datagram comprising real-time data.

18. A flow classifier according to claim 14, wherein said plurality of feature classifiers includes a feature classifier capable of checking if the payload size of a transport layer datagram in a flow of said session is at least as large as a smallest possible datagram of any application comprising real-time data.

19. A flow classifier according to claim 14, wherein the real-time flow carries Real-time Transfer Protocol frames and the flow is a User Datagram Protocol flow.

20. A method for distinguishing a real-time flow from non-real-time flows in a stream of Internet Protocol packets in an Internet Protocol network, said method comprising:

checking one or more of a plurality of features of said flow, each of said plurality of features being indicative of said flow being either not a real-time flow or possibly a real-time flow wherein said checking step includes the step of checking a payload size of a transport layer datagram of a packet in the flow of said session, and deciding that said flow is a real-time flow if said checking step is indicative of all of said plurality of features being possibly a real-time flow.

21. The method according to claim 20, wherein said Internet Protocol network includes a node receiving an aggregated flow of Internet Protocol datagram, and wherein said method includes the step of distinguishing at least one set of flow in the aggregated flow, each flow corresponding to a uni-directional packet stream from a single session.

22. The method according to claim 21, wherein said checking step includes the step of checking if values of possible header fields of an application datagram in the flow of said session satisfy range restrictions of a header of an application datagram comprising real-time data.

23. The method according to claim 21, wherein said checking step includes the step of checking for static behavior in header fields of a number of consecutive data packets of said session.

24. The method according to claim 21, wherein said checking step includes the step of checking for incremental behavior of header fields of a number of consecutive data packets of said session.

25. The method according to claim 21, comprising the further step of reporting a decision made in said deciding step to the node.

26. The method according to claim 20, wherein the step of checking the payload size of the datagram of the transport layer comprises checking if the payload size of the datagram of the transport layer is at least as large as a smallest possible datagram of any session comprising real-time data.

27. The method according to claim 25, wherein an outgoing link of the node is a radio link, and wherein, after reporting the decision to the radio link, the method includes the further step of allocating at least one radio resource on basis of whether or not the flow is a real-time flow.

28. The method according to claim 25, wherein, after reporting the decision to the node, the method includes the further step of requesting a link layer to recover from errors if the flow is non-real-time flow.

29. The method according to claim 25, wherein, after reporting the decision to the node, the method includes the further step of requesting the link layer to not recover from errors if the flow is a real-time flow.

30. The method according to claim 25, wherein the node is a switch, and wherein, after reporting the decision to the switch, the method includes the further step of prioritizing flow which is a real-time flow over flows which are non-real-time flows when switching.

31. The method according to claim 25, wherein the node is a router, and wherein, after reporting the decision to the router, the method includes the further step of prioritizing a flow which is a real-time flow over flows which are non-real-time flows when routing.

32. The method according to claim 20, wherein the real-time flow carries Real-time Transfer Protocol frames and the flow is a User Datagram Protocol flow.

* * * * *